Sept. 2, 1947.                M. A. THOMPSON                2,426,956
                              VENDING MACHINE
                         Filed Nov. 20, 1944        2 Sheets-Sheet 1

Martin A. Thompson INVENTOR.
BY Bush & Bush
His Attorneys.

Sept. 2, 1947.　　　　M. A. THOMPSON　　　　2,426,956
VENDING MACHINE
Filed Nov. 20, 1944　　　　2 Sheets-Sheet 2

Martin A. Thompson, INVENTOR.
BY Bush & Bush
His Attorneys.

Patented Sept. 2, 1947

2,426,956

UNITED STATES PATENT OFFICE 2,426,956

VENDING MACHINE

Martin A. Thompson, Davenport, Iowa, assignor of one-half to J. Vern Gregg, Davenport, Iowa Application November 20, 1944, Serial No. 564,283

6 Claims. (Cl. 312—70)

My invention relates to improvements in vending or distributing machines and is particularly applicable to machines for distributing sliced bread.

The objects of my invention are to provide a closed container which will hold one or more loaves of sliced bread or other food arranged in layers, and protect it from exposure to the air so as to prevent drying out;

To provide mechanism which can be manually operated by the customer by pressing the edge of his plate against a suitable lever and which will cause the desired number of slices or portions to drop from the container onto his plate;

To provide means which will guard against the slices or portions being handled by anyone other than the particular customer obtaining same;

To provide simple, easily operated dispensing apparatus for bread and other foods which may be arranged in multiple units so as to provide for obtaining different kinds of bread.

Other objects will appear from the description.

The preferred form of my apparatus is illustrated in the accompanying drawings, in which.

Figure 9:
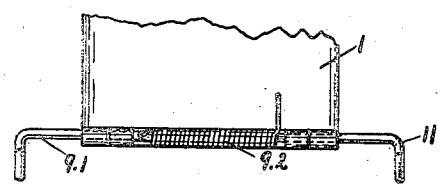

Figure 9 is a detail showing an alternate form of spring which may be utilized to return the link 30 and the doors 8 and 8.1 from open to closed position.

Similar numerals refer to similar parts throughout the several views.

My apparatus comprises a rectangular metal body or casing 1 preferably long enough to contain two or three entire loaves of bread, having a door 2, preferably at the front, hinged to the body upon hinges 3 which will open to allow the bread or other food to be inserted.

Adjustable side plates 01 are adjustably mounted within the body or casing 1 upon bolts 31 upon which wing or knurled nuts 32 are threaded. The wing or knurled nuts are made integral with annular discs 33 which fit under and over brackets 34 suitably united to the body or casing upon the opposite sides thereof. The side plates are rigidly secured to the inner ends of the bolts 31 which will permit the side plates 01 to be adjusted toward or away from the side of the casing 1 with the bolt 31, so as to fit loaves of different widths.

The lower ends of the side plates are provided with a plurality of slots 0.1 which correspond to similar slots 1.1 formed in the lower ends of the sides of the body and which permit the entrance and vertical adjustment of the needle points hereinafter described.

At the bottom of the body or casing, doors 8 and 8.1 are united to the lower end of the casing or body, preferably with spring hinges 9.2 which act to hold the doors in their closed position. These doors are hinged upon transverse bars 9 and 9.1. The ends of the bar 9 are bent upwardly to form arms 10 and the ends of the bar 9.1 are bent inwardly and slightly downwardly to form arms 11.

Links 30 are pivotally united to the ends of the arms 10 and 11 at each side of the machine by pivots 12 and 14. The lower end of the links 30 has a rigidly outwardly extending arm 13 formed thereon to be contacted by the operating lever as hereinafter described.

A coiled spring 27 has its upper end united to the body and its lower end secured upon the pivot 14 uniting one of the arms 11 to its corresponding link 30 whereby upward traction may be exerted upon the arm 11 to hold the doors 8 in normal closed position.

Figure 2:
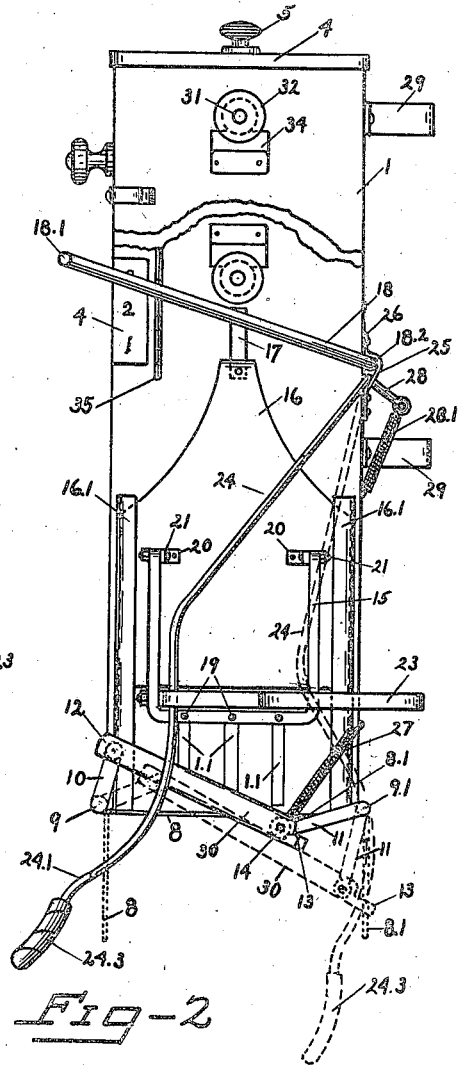
Figure 2 is a side elevation from the right of Figure 1.
Figure 4:
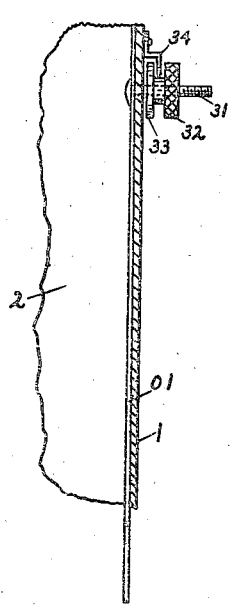
Figure 4 is an enlarged detail to show the method of securing the adjustable inner walls to the sides of the casing.
Figure 5:
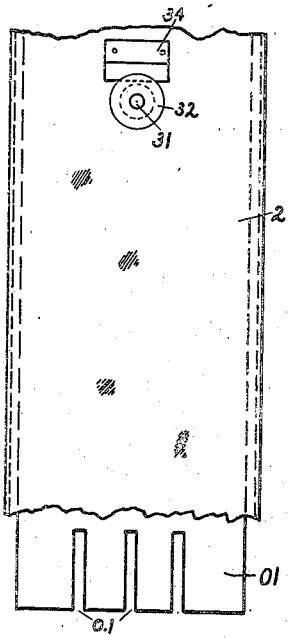
Figure 5 is a detail showing the slots in the lower ends of the adjustable walls.
Figure 6:
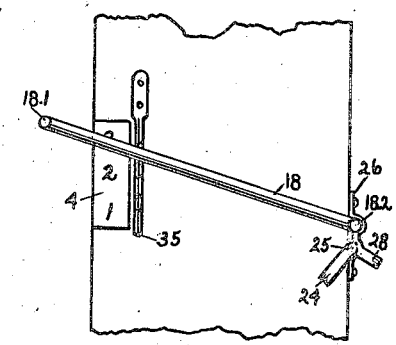
Figure 6 is a detail of the index plate and spring detent-bar.
Figure 7:
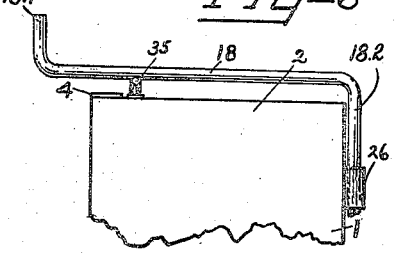
Figure 7 is a plan view of the adjusting lever 18 with parts of the operating means removed.
Figure 8:
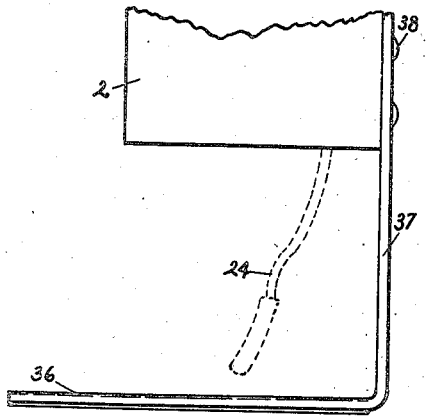
Figure 8 is a partial side elevation showing the supporting base united to the casing.

An operating lever 24 has a crossbar 25 pivotally mounted in a transverse bracket 26 across the back of the body with a pair of arms formed integral therewith and extending forwardly and downwardly as shown in Figure 2 and forming a part of the operating lever 24.

The lower part of these arms is provided with a transverse section 24.1 having a U-shaped middle portion 24.2 extending downwardly and this middle portion is preferably covered with rubber tubing 24.3 or other resilient covering and is arranged so that the edge of a plate held horizontally may be pushed against it and drive the lower end of the lever backwardly until the plate is directly under the lower end of the body and in position to catch the slices of bread as discharged by the opening of the doors 8 and 8.1.

In order to hold the loaf of bread in position and permit the lower slice or two or three slices to drop out, I provide sets of needles 19 carried by U-shaped needle or detent bars 15 which have side arms extending upwardly and pivotally united to suitable brackets 20 by pivots 21. The brackets 20 are riveted or otherwise suitably secured to a slide 16 the upper part of which is connected by a bar 17 to an adjusting lever 18. The slide 16 is secured in place and slides in flanges 16.1 united to the body. A notched spring detent bar 35 is mounted upon one side of the body and bears against one of the side arms of the lever 18 so that the notches will form a detent to detain the lever in adjusted position. The lever is movable for a sufficient distance to adjust the position of the slide 16 so that the needles 19 will enter through the second, third or fourth slice from the bottom of the lowest loaf of bread and thereby permit either one, two or three slices to be dropped according to the adjusted position occupied when the actuating lever 24 is operated.

The adjusting lever 18, comprises two lateral arms united by the transverse portion 18.2 which may be pivotally mounted in the same brackets 26 as the transverse portion 25, of the lever 24 or otherwise pivoted to the body as desired.

In order to actuate the needle bar I mount thereon a loop 23 of metal secured to the needle bar by a bolt or rivet 23.1. This loop embraces one arm of the lever 24 and extends rearwardly. The front half of the loop is arranged at a suitable angle to the needle bar so that as the lever 24 is moved rearwardly, it will bear against one side of the loop 23 and cause the needle bar to be moved inwardly so that the needles will penetrate the bread. This is designed to take up about one-half of the motion of the lever 24. The remainder of the loop is arranged parallel to the needle bar and the motion of the lever through the parallel portion of the loop will cause the lever 24 to impinge upon the arm 13 and turn the arms 10 and 11 upon their pivots so as to open the doors 8 and 8.1 and the bread can then drop down onto the plate of the operator.

The slides 16, needle bars 15, loops 23, levers 24 and levers 18 may be the same on both sides of the machine so that the description above given will apply to either side, but one of the arms of the lever 18 may extend forwardly from the front of the body and be provided with a handle 18.1 and one handle will be sufficient.

In order to hold the levers 24 with the doors in closed position, I provide arms 28, extending outwardly from crossbar 25 at the rear of the machine and connect them to the body by the coiled spring 28.1 which will exert tension upon the arms 28 to hold the lever 24 in closed position.

If desired, instead of using separate springs for the arms 28 and the arms 11, a single tension spring may be used to connect the free ends of the arms 28 and the arms 11 whereby tension will be continuously exerted upon both of said arms.

My apparatus may be provided with brackets 29 in the form of rectangular loops united to the rear of the body by which it can be hung upon a wall on pegs, hooks or any other common form of support and may also be provided with a base-plate 36 having an upwardly extending arm or section 37 to which the body may be secured by bolts or rivets 38. The base 36 will be spaced far enough below the body to permit free movement of the lever 24 and the application of the plate of the customer.

A window 7 may be united to the door through which the quantity of bread remaining may be observed. An index plate 4 may be mounted upon the front of the machine with numerals 1, 2 and 3 thereon to indicate the number of slices to be dispensed in the different positions of the lever 18.

Figure 1:
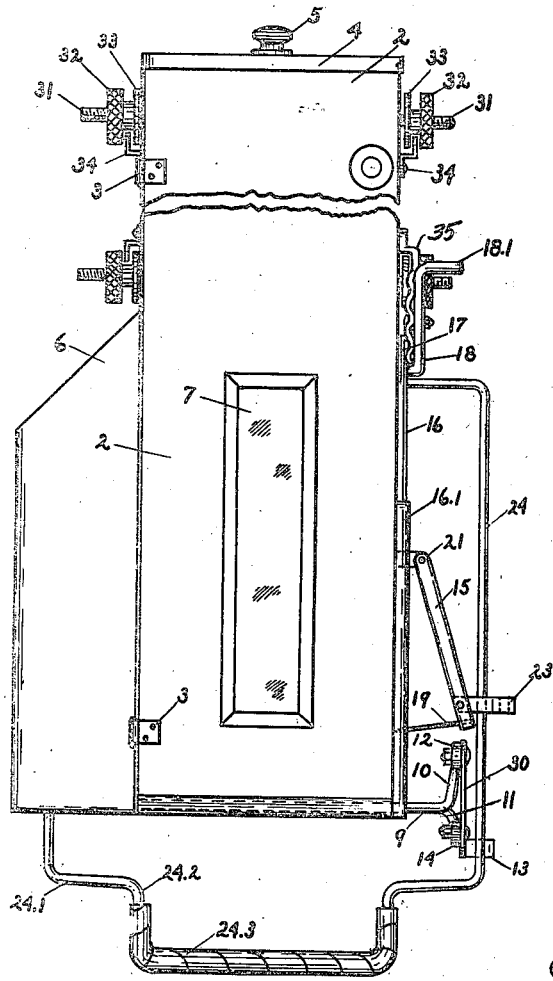
Figure 1 is a front elevation of my apparatus but with one of the lateral housings removed to disclose the moving parts.

A top or cover 4 may be provided with a knob 5 united thereto for use as a handle and may fit easily upon the top of the casing or cabinet. In order to protect the working parts from dust and prevent injury to fingers or other things coming in contact with the working parts, a housing or shield 6 should be added on each side of the casing or body and may be attached to the main casing by any suitable means or formed integral therewith and with an opening in the top thereof to accommodate the bars 18 and 35. In Figure 1 this shield is omitted from the right side of the figure so as to disclose the working parts.

While I have shown two doors at the bottom of the casing to support the loaf of bread and have shown them as covering the entire opening, it is obvious that a single door, covering approximately half or even less of the opening, would be ample to support the loaf of bread and either the door 8 or the door 8.1 can be omitted without substantially impairing the operation of my apparatus. I accordingly do not limit my claims, except as specifically stated therein, to the use of two doors.

In the specification and claims I use the terms "body" or "casing" or "cabinet" as meaning the vertical tubular structure 1 as shown in Figures 2, 3, 4, 6, 7 and 9 and the term "detent bar" as used in the claims to refer to the needle bar as used in the specification or to any recognized equivalent therefor.

It is obvious that various modifications may be made in the size, shape and arrangement of the parts of my apparatus without departing from the spirit of my invention and I do not limit my claims to the precise mechanism illustrated in the drawings.

While I have described my apparatus as used with sliced bread, it is obvious that it may be utilized for other forms of food such as thin crusted rolls, etc. arranged in stacks with layers of uniform thickness. I have shown needles as my preferred form of detent for holding the loaves in position while the last slice or two or three slices are being removed.

Figure 3:
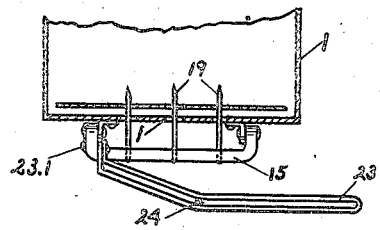
Figure 3 is a sectional detail of the needle bars and loop, but showing the loop pivoted to the casing instead of to the slide 16 and with the slide 16 omitted.

The detent may be adjustable by having the detent-bars pivoted to the slides 16 as shown in Figure 2 or non-adjustable detents may be made by pivoting the detent-bars to the casing itself as shown in Figure 3.

I claim:

1. A dispenser for sliced bread comprising a vertical casing having an opening for the insertion of one or more sliced loaves of bread therein on end, a horizontal door united to a hinge-bar revolvably secured to the lower edge of the casing to support the bread when in closed position, a spring attached to and coacting with the casing and the hinge-bar to hold the door normally in closed position, a manually vertically adjustable slide slidingly mounted in flanges united to a side of the casing near the lower end thereof, a detent-bar pivotally mounted upon the slide and having vertical arms united at the lower end by a transverse crossbar, inwardly projecting pins rigidly united to the crossbar, vertical slots in the lower part of the casing through which the pins may project, an operating lever pivotally mounted upon the casing with its free end extending below the casing, a loop-bar having its front end united to the detent-bar and an intermediate section extending rearwardly and outwardly from the detent-bar and a rear section continuous therewith and extending parallel to the detent-crossbar, said operating bar being arranged to extend through the loop-bar and to move the detent-bar inwardly during a portion of the travel of the operating bar, and an arm formed integral with the hinge-bar of the door with its free end pivotally united to one end of a link bar, the other end of which carries a lateral projection to contact and be actuated by the operating lever to open the door during the latter part of its travel.

2. A bread dispenser as described in claim 1, and resilient means coacting with the operating lever to return the operating lever to forward position upon being released after each actuation thereof.

3. A bread dispenser for sliced bread comprising a vertical casing having a front door for the insertion of one or more sliced loaves of bread therein, a pair of horizontal doors secured by hinge-bars to the lower edge of the casing to support the bread when in closed position, arms united to the hinge bars and a connecting link between the arms, a spring coacting with the arms, link and one of the hinge-bars to hold the horizontal doors in normal closed position, adjustable slides slidingly mounted in vertical flanges united to the casing on opposite sides and near the lower end thereof, detent-bars pivotally mounted upon the slides respectively having vertical arms united at the lower end by transverse crossbars, inwardly projecting pins rigidly united to the crossbars, an operating loop-shaped lever pivotally mounted upon and surrounding the casing with its free end extending below the casing, loop-bars having their front ends respectively united to the detent-bars and having intermediate sections extending rearwardly and outwardly from the detent-bars and rear sections continuous therewith and extending parallel to the detent-cross bars, the operating bar being arranged to extend through the loop-bars and to move the detent-bars inwardly during a portion of the travel of the operating bar, and arms formed integral with the hinge bars of the doors with their free ends pivotally united to one end of a link bar the other end of which carries a stop formed integral with the link in position to contact and be actuated by the operating lever to open the doors during the latter part of its travel.

4. A bread dispenser for sliced bread comprising a vertical casing having an opening for the insertion of one or more sliced loaves of bread therein, a pair of horizontal doors secured by hinged bars to the lower edge of the casing to support the bread when in closed position, arms united to the hinge bars and a connecting link between the arms, a spring coacting with the arms, link and one of the hinge-bars to hold the door in normal closed position, vertically adjustable slides slidingly mounted in vertical flanges united to the casing on opposite sides and near the lower end thereof, detent-bars pivotally mounted upon the slides respectively having vertical arms united at the lower end by a transverse crossbar, inwardly projecting pins rigidly united to the crossbars, an operating lever having side arms united by crossbars at top and bottom pivotally mounted upon and surrounding the casing with its free end extending below the casing, loop-bars having their front ends respectively united to the detent-bars and having intermediate sections extending rearwardly and outwardly from the detent-bars and rear sections continuous therewith and extending parallel to the detent-crossbars, the operating lever being arranged to coact with the loop-bars and to move the detent-crossbars inwardly during a portion of the travel of the operating lever and arms formed integral with the hinge bars of the doors with their free ends pivotally united to one end of a link bar, the other end of which carries a stop formed integral with the link bar in position to contact and be actuated by the operating lever during the latter part of its travel, to open the doors.

5. A bread dispenser as described in claim 1 and a manually adjustable lever pivoted on the casing with forwardly extending arms connected to the slides by links pivotally united thereto.

6. A bread dispenser as described in claim 1, a manually adjustable lever pivoted on the casing with forwardly extending arms connected to the slides by links pivotally united thereto, and a notched or serrated detent-bar mounted upon the casing to contact and retain the adjusting lever in any one of a plurality of adjusted positions.

MARTIN A. THOMPSON.

REFERENCES CITED

The following references are of record in the file of this patent:

UNITED STATES PATENTS

| Number | Name | Date |
|---|---|---|
| 1,621,619 | Ashe | Mar. 22, 1927 |
| 1,830,805 | Myer | Nov. 10, 1931 |
| 2,272,669 | Johnson | Feb. 10, 1942 |